(12) United States Patent
Hong et al.

(10) Patent No.: US 7,409,718 B1
(45) Date of Patent: Aug. 5, 2008

(54) METHOD OF DECRYPTING AND ANALYZING ENCRYPTED MALICIOUS SCRIPTS

(75) Inventors: Man-Pyo Hong, Seongnam (KR); Sung-Wook Lee, Suwon (KR); Si-Haeng Cho, Seoul (KR)

(73) Assignee: Ajou University Industry Cooperation Foundation, Suwon-Si, Geyonggi-Do (KR)

( * ) Notice: Subject to any disclaimer, the term of this patent is extended or adjusted under 35 U.S.C. 154(b) by 1051 days.

(21) Appl. No.: 10/685,153

(22) Filed: Oct. 14, 2003

(30) Foreign Application Priority Data

Mar. 14, 2003 (KR) .................. 10-2003-0016206

(51) Int. Cl.
*G06F 21/00* (2006.01)
(52) U.S. Cl. .................................... 726/24
(58) Field of Classification Search .............. 726/24
See application file for complete search history.

(56) References Cited

U.S. PATENT DOCUMENTS

| | | | | |
|---|---|---|---|---|
| 5,696,822 A * | 12/1997 | Nachenberg | ............... | 726/24 |
| 5,964,889 A * | 10/1999 | Nachenberg | ............... | 714/25 |
| 6,851,057 B1 * | 2/2005 | Nachenberg | ............... | 726/24 |
| 6,907,396 B1 * | 6/2005 | Muttik et al. | ............... | 703/22 |
| 2003/0159070 A1 | 8/2003 | Mayer et al. | | |
| 2003/0159090 A1 | 8/2003 | Wray et al. | | |

OTHER PUBLICATIONS

Journal of Korea Information Science Society: Information Networking, vol. 29, No. 5, Oct. 2002.

* cited by examiner

*Primary Examiner*—Kambiz Zand
*Assistant Examiner*—Andrew L Nalven
(74) *Attorney, Agent, or Firm*—Dilworth & Barrese, LLP (57) ABSTRACT

Disclosed herein is a method of analyzing and decrypting encrypted malicious scripts. The method of the present invention comprises the steps of classifying a malicious script encryption method into a case where a decryption function exists in malicious scripts and is an independent function that is not dependent on external codes such as run time library, a case where a decryption function exists and is a dependent function that is dependent on external codes, and a case where a decryption function does not exist; and if the decryption function exists in malicious scripts and is the independent function that is not dependent on the external codes, extracting a call expression and a function definition for the independent function, executing or emulating the extracted call expression and function definition for the independent function, and obtaining a decrypted script by putting a result value based on the execution or emulation into an original script at which an original call expression is located. According to the present invention, unknown malicious codes can be promptly and easily decrypted through only a single decryption algorithm without any additional data. In addition to the decryption of encrypted codes, complexity of later code analysis can also be reduced by substituting constants for all values that can be set as constants in a relevant script.

2 Claims, 5 Drawing Sheets

```
Execute(snphhuatvsbkwuj("&Wcr/Wcrvf/H,Vnsl/@w ...... doelgtobuhno"))

Function snphhuatvsbkwuj(zwbyjntbpmhqqgh)
    For vvpzxfszgnczrao = 1 To Len(zwbyjntbpmhqqgh)
        ccuhbhjhyzkheeq = Mid(zwbyjntbpmhqqgh, vvpzxfszgnczrao, 1)
        If Asc(ccuhbhjhyzkheeq) = 7 Then
            ccuhbhjhyzkheeq =Chr(34)
        End If
        If Asc(ccuhbhjhyzkheeq) <> 35 and Asc(ccuhbhjhyzkheeq) <> 34 Then
            If Asc(ccuhbhjhyzkheeq) Mod 2 = 0 Then
                ccuhbhjhyzkheeq = Chr(Asc(ccuhbhjhyzkheeq) + 1)
            Else
                ccuhbhjhyzkheeq = Chr(Asc(ccuhbhjhyzkheeq) - 1)
            End If
        End If
        snphhuatvsbkwuj = snphhuatvsbkwuj & ccuhbhjhyzkheeq
    Next
End Function
```

FIG. 3

```
...
Set Roy = Maggie.CreateTextFile(Maggie.BuildPath(Maggie.GetSpecialFolder(2),V("7594E44554D405E2458545")),True)
Roy.WriteLine(V("E402") & Maggie.BuildPath(Maggie.GetSpecialFolder(2),V("7594E44554D405E245D405")))
Roy.WriteLine("E 0100" & H("4D5AE7016300010006002406FFFF5F0C"))
Roy.WriteLine("E 0110" & H("000200000001F0FF5700000001325048"))
...
...
Function V(Van)
    For Kirk = 1 To Len(Van) Step 2
        V = V & Chr("&h" & Mid(Van,Kirk + 1,1) & Mid(Van,Kirk,1))
    Next
End Function Function H(Houten)
    For Luann = 1 To Len(Houten) Step 2
        H = H & " " & Mid(Houten,Luann,2)
    Next
End Function
```

FIG. 4

| EXTRACT INDEPENDENT FUNCTION CALL EXPRESSIONS AND DEFINITIONS | S410 |

↓

| EXECUTE OR EMULATE THE EXTRACTED CALL EXPRESSIONS AND DEFINITIONS | S420 |

↓

| SUBSTITUTE RESULT VALUES PRODUCED BY THE EXECUTION OR EMULATION FOR VARIABLES OF AN ORIGINAL SCRIPT | S430 |

↓

| OBTAIN A DECRYPTED SCRIPT | S440 |

```
...
set maggie = createobject ("Scripting.FileSystemObject")
set marjorie = maggie.createtextfile(maggie.buildpath(maggie.getspecialfolder(2), "WINTEMP1.BAT")), true)
marjorie.writeline("@echo off")
marjorie.writeline("debug.exe <" & maggie.buildpath(maggie.getspecialfolder(2), "WINTEMP.TXT") & " >nul")
marjorie.close
set roy = maggie.createtextfile(maggie.buildpath(maggie.getspecialfolder(2), "WINTEMP.TXT"), true)
roy.writeline("N " & maggie.buildpath(maggie.getspecialfolder(2), "WINTEMP.TMP"))
...
```

METHOD OF DECRYPTING AND ANALYZING ENCRYPTED MALICIOUS SCRIPTS

BACKGROUND OF THE INVENTION

1. Field of the Invention

The present invention relates to a method of analyzing and decrypting encrypted malicious scripts, and more particularly, to a technology for flexibly coping with a new encryption scheme through an analytical approach to a conventional script encryption scheme.

2. Description of the Related Art

In general, encryption means a process or technique of encoding messages so that the meanings of the messages are not revealed. However, encryption in computer viruses or malicious codes means a technique for hiding signatures of malicious codes from a virus scanner by scrambling the malicious codes. A signature, which is a short character string present only in a specific malicious code but not present in other programs, is used for distinguishing the specific malicious code from legitimate programs and identifying the kind of malicious code. Since a malicious code detection system using the signature is relatively fast as compared to other techniques, most of the existing anti-virus products have generally employed such a signature-based detection system augmented with some heuristic algorithms.

By the way, to avoid such a signature-based detection system, malicious code creators add separate encryption functions to viruses. In general, an encrypted malicious code consists of a decryption routine, a key value, and an encrypted malicious code. Further, the decryption routine is performed first when the system is executed. Therefore, the decryption routine decrypts the encrypted malicious code and passes a control to the malicious code decrypted such that the malicious code can be executed. This allows the malicious code not to be detected by simple scanning since the malicious code becomes a completely different code only by encoding itself using a new key value when making an attempt at self-replication in the other systems or files.

On the other hand, X-raying and emulation techniques are used to cope with such an encrypted malicious code. The X-raying technique attempts all cases (Brute-force decryption) after narrowing a detection range by using known information about the signature discovered from the relevant malicious code and the decryption algorithm used by the malicious code. In other words, in a case where all the information about the encryption technique and the signature of the relevant malicious code is known but only a precise key value is unknown, the character string at a position where the signature can appear is decrypted by using all possible key values and it is then checked whether the decrypted character string has the same value as the signature so that it can be determined whether there are any malicious codes. However, there is a disadvantage in that it is difficult to apply the X-raying technique to a new unknown malicious code, because it is feasible after sufficient known information has been obtained by thoroughly analyzing an encryption scheme and properties of a malicious code to be searched for.

The emulation technique obtains a code decrypted by emulating a malicious code. In a binary malicious code, a decrypted malicious code can be obtained by executing a portion of a relevant code in a virtual machine, because a decryption routine is first executed and is very small in size. At this time, if all decrypted codes are to be obtained, each memory unit in the virtual machine should be monitored and the execution should continue until values in a memory of a code portion are not further varied. In addition, if the emulation technique is used combined with a signature-based detection method, the emulation stops immediately after decryption for values of memory in which the signature resides has been completed, and signature comparison is then performed. Although the emulation technique for completely (unconditionally) emulating the malicious code up to the specific point of time is effective to decrypt a malicious code in a binary file format, it is difficult to construct an emulator for scripts as compared to a binary execution file. In other words, in order to achieve complete emulation, all the possible environments where an object code can be executed must be virtually created. However, it is realistically difficult to emulate a variety of objects and environments used in a relevant program in case of a script language such as a Microsoft Visual Basic Script, and a large load is required in such a case. In addition, contrary to general codes that do no harm, a method of profiling execution details through a simple execution of code cannot be used for a malicious code.

In conclusion, since the aforementioned methods are either applicable only to a case where the properties and behaviors of a relevant malicious code are known or suitable for decrypting the malicious code in a binary file format, it is difficult to apply them to unknown encrypted scripts. Therefore, a heuristic-based methodology in which pattern of an encryption technique and its decryption method used in the conventional script malicious codes are defined and used is regarded as a most realistic decryption technique for the script malicious codes. For example, the conventional various visual basic script malicious codes are configured in such a manner that an actual malicious code is encrypted into one character string and is executed through an 'execute' sentence defined in a script language. In this case, a decrypted malicious code can be obtained by regarding a function, which is called from the 'execute' sentence found in a given script, as a decryption function and executing or emulating this function. This type of decryption function consists of only a BASIC language structure that does not use all the aforementioned objects and environments, and it is executed only once in the head of program. Therefore, since this type of decryption function can be executed by only a light-weighted emulator with a basic function without requiring the complete emulation as mentioned above, burden for the emulation and the emulator construction is not serious.

According to a heuristic-based approach, however, it is required to add a code capable of dealing with new encryption patterns to a virus scanner whenever the new encryption patterns appear. Thus, there is an essential problem in that it is difficult to smoothly cope with unknown malicious scripts. Particularly, it is difficult to smoothly cope with a partial encryption in the unit of character string present uniquely in the scrip malicious codes.

SUMMARY OF THE INVENTION

Accordingly, the present invention is conceived to solve the aforementioned problems. An objective of the present invention is to provide a method of analyzing and decrypting a encrypted malicious script, which is capable of flexibly coping with an advent of new encryption techniques through an establishment of precise classification system covering future encryption techniques as well as current encryption techniques and an analytical approach to the script encryption techniques.

In order to accomplish the objective, there is provided a method of analyzing and decrypting a malicious encryption script, which comprises the steps of classifying a malicious script encryption method into a case where a decryption function exists in malicious scripts and is an independent function that is not dependent on the external codes such as run time library, a case where a decryption function exists and is a dependent function that is dependent on external codes, and a case where a decryption function does not exist; and if the decryption function exists in malicious scripts and is the independent function that is not dependent on the external codes, extracting a call expression and a function definition for the independent function, executing or emulating the extracted call expression and function definition for the independent function, and obtaining a decrypted script by putting a result value based on the execution or emulation into an original script at which an original call expression is located.

At this time, whether there exists the dependency of the decryption function on the external codes can be determined based on whether there exists the dependency of all codes within the decryption function on the external codes, whether actual parameters for decryption function call in all program are constants, and whether only functions with no side effects in the decryption function are called.

Further, upon determination of the dependency of all codes within the decryption function on the external codes, all codes within function $F_i$ may be determined as having no dependency on the external codes if function $F_i$ satisfies the following formula:

$$V_i \cap E_i = \Phi,$$

where $V_i$ is a set of global variables defined or used in function $F_i$, and is obtained according to the following formula:

$$V_i = A_i - D_i, \text{ and}$$

$E_i$ is a set of variables defined or used in an external region of function $F_i$ and is obtained according to the following formula:

$$E_i = \bigcup_{i \neq j, 0 \leq j \leq n} V_j$$

where n is the number of functions defined in the script, $F_i$ is an i-th defined function in the script ($1 \leq i \leq n$), $A_i$ is a set of all variables defined or used in function $F_i$ ($1 \leq i \leq n$), $D_i$ is a set of all variables declared as Dim in function $F_i$ ($1 \leq i \leq n$), and $V_0$ is a set of variables defined or used in a global region which does not belong to any function.

BRIEF DESCRIPTION OF THE DRAWINGS

The above and other objects, features and other advantages of the present invention will be more clearly understood from the following detailed description in connection with the accompanying drawings, in which.

DESCRIPTION OF THE PREFERRED EMBODIMENTS

Hereinafter, the present invention will be described in detail with reference to the accompanying drawings.

Figure 1:
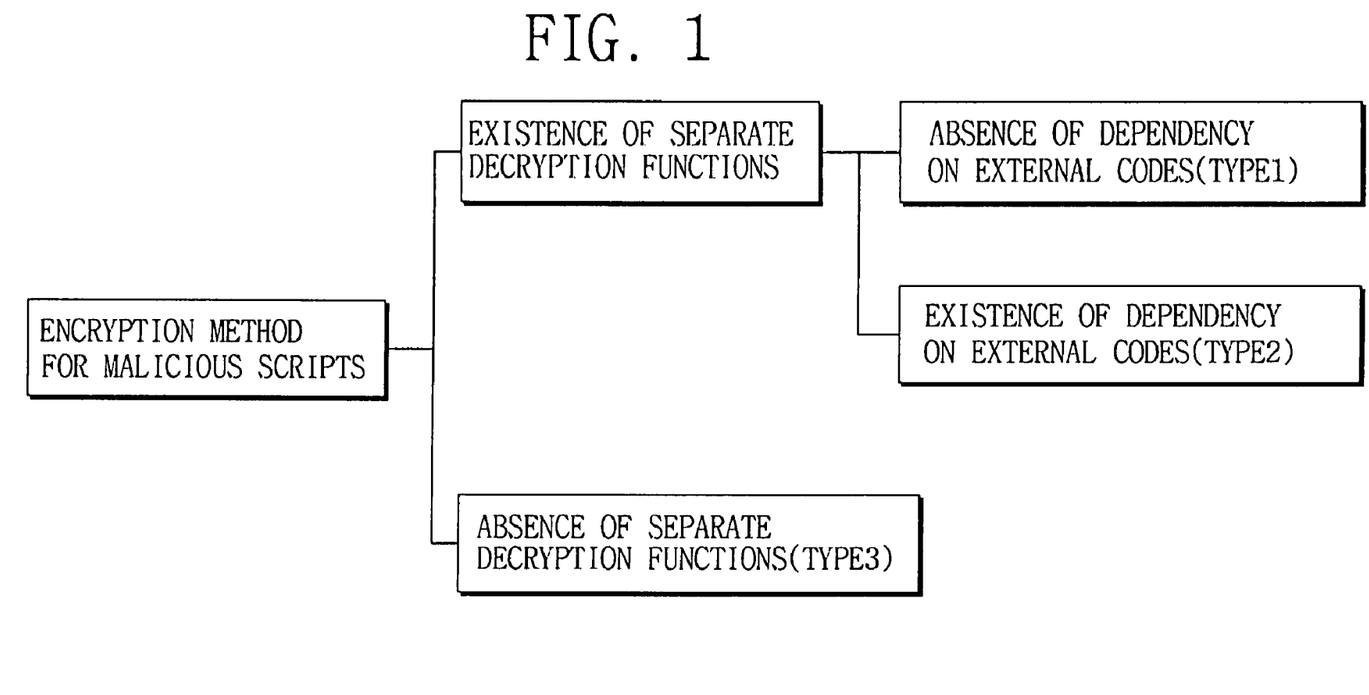
FIG. 1 is a classification diagram of a technique for encrypting a malicious script according to the present invention.

FIG. 1 is a classification diagram of an encryption technique for a malicious script according to the present invention, where the encryption technique is classified based on the degree of correlation between a decryption routine with a body of a malicious code. In other words, the encryption technique is classified based on the presence of decryption function and the presence of dependency of the decryption function on external codes when the decryption function is present. Therefore, the encryption technique can be classified into the following three cases: i.e., a first case ("Type 1") where a separate decryption function is present and the decryption function is an independent function that is not dependent on the external codes, a second case ("Type 2") where a separate decryption function is present and the decryption function is a dependent function that is dependent on the external codes, and a third case ("Type 3") where a decryption function is not present. Type 1 corresponds to a case where a decryption function is most independent and thus independent execution thereof can be performed, and Type 3 corresponds to a case where the decryption function is closely correlated with an execution state of a program since it is inserted into an arbitrary portion of the whole code.

In the meantime, in order to more clarify this classification, it is necessary to define the dependency of a decryption function on external codes unlike the dependency between codes defined within a single routine. Particularly, it is considered that "a function f has no dependency on the external codes" or "a function f is independent" when the function f defined within a program code satisfies the following three conditions. At this time, the function f is referred to as an independent function.

① All codes within a function should have no dependency on external codes. In other words, the relation, $V(f) \cap E(f) = \Phi$, should be established, where V(f) is a set of global variables defined or used in interior region of the function f and E(f) is a set of variables defined or used in an external region of the function f.

② Actual parameters for the call of function f within all programs should be given as constants. This is because the actual parameters generate the dependency if they are given as variables.

③ Only a function with no side effect within the function should be called. Here, the side effect is referred to as I/O or all actions for inducing the I/O, including a case where the dependency is indirectly induced by executing other functions having the dependency on the external codes.

Now, the condition ① will be more specifically described. To determine whether a specific function is an independent function, the function and variables used by the function should be analyzed. Functions that can be used by the independent function include only built-in functions and the other independent functions with no side effect. Since the built-in functions are explicitly defined in a language specification, it can be easily determined whether any built-in functions are used by additionally defining a list of functions with no side effect such as I/O among the built-in functions. However, an operation of checking whether the relevant function uses only local variables should be subjected to complex procedures.

For a general function-based language used after all variables are explicitly declared, an operation of extracting a set of variables declared in each region and checking whether a global function is used within the relevant function can be relatively simply performed. However, an interpreter-based script language such as a Visual Basic Script does not necessarily require the declaration of a variable, unlike the general function-based language. In addition, even though variables are defined within a function, the variables are all regarded as global variables if they are not specified as local variables through DIM statements. Therefore, in order to obtain a complete list of global variables, all codes must be checked throughout the inside of each function. Conditions capable of determining whether there exists an independent function for a decryption algorithm are defined as follow. First, symbols to be used herein are defined as below:

n=the number of functions defined in the script, $F_i$=an i-th defined function in the script ($1 \leq i \leq n$), $A_i$=a set of variables defined or used within the function $F_i$ ($1 \leq i \leq n$), $D_i$=a set of variables declared as Dim in the function $F_i$ ($1 \leq i \leq n$), and $V_0$=a set of variables defined or used in a global region which does not belong to any function.

Here, $V_i$ corresponding to a set of global variables defined or used within the function $F_i$ and $E_i$ corresponding to a set of variables defined or used in an external region of the function $F_i$ can be obtained by the following formula 1 and 2, respectively:

$$V_i = A_i - D_i, \quad (1)$$

$$E_i = \bigcup_{i \neq j, 0 \leq j \leq n} V_j \quad (2)$$

Therefore, the function $F_i$ should satisfy the following formula 3 if it will be an independent function:

$$V_i \cap E_i = \Phi \quad (3)$$

In other words, an independent function $F_i$ is a function that neither defines nor uses any variables defined or used in the external region of the function itself.

Figure 2:
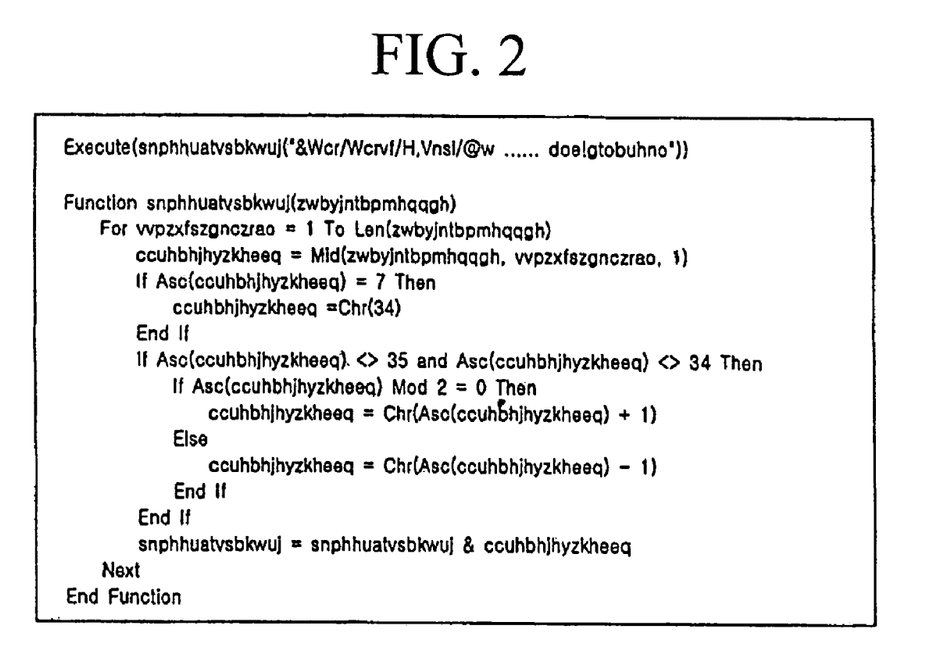
FIG. 2 is an example of a malicious script encrypted into one character string.

Furthermore, the malicious script encryption technique will be considered in a practical point of view. Encryption patterns of current general script malicious codes can be generally classified into the following two patterns. A first pattern corresponds to a case where an entire malicious code is encrypted into one character string. FIG. 2 shows a malicious script named VBS/VBSWG.T. An 'execute' statement in the visual basic script first calls a decryption function since the visual basic script is executed while regarding a character string given in the form of a parameter as a program code. Therefore, an entire code begins to be executed after it is completely decrypted.

Figure 3:
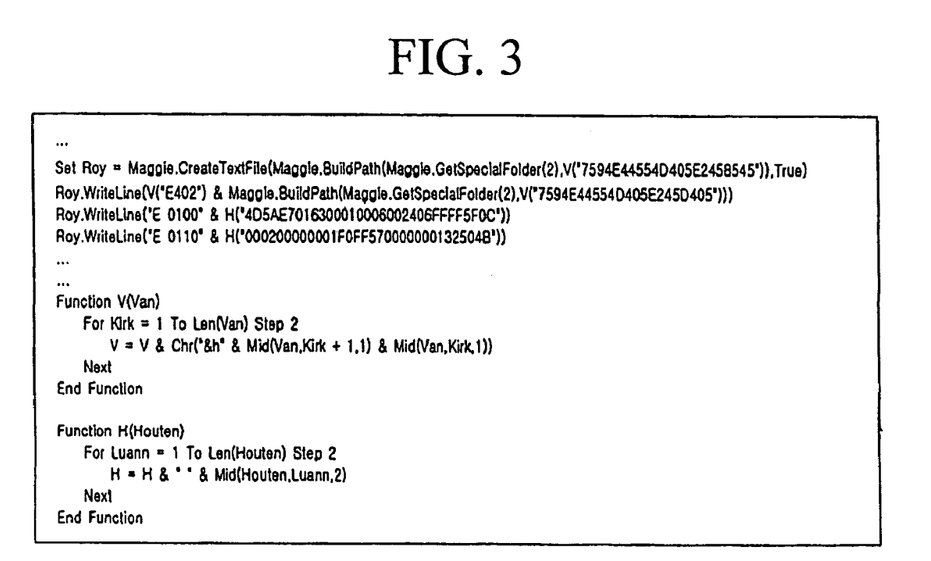
FIG. 3 is an example of a malicious script with some character strings encrypted therein.

A second pattern corresponds to a case where a portion of character string used in a program is encrypted. FIG. 3 shows a malicious script named VBS/TripleSix. This type of malicious script has one or more decryption functions and shows a form that any character strings used for right side values (r-values) of a parameter or assignment statement of a function are encrypted. Therefore, unlike the first pattern, the second pattern is operated in such a manner that a required character string is decrypted at a desired time during execution.

At this time, the first pattern can be merely decrypted by a simple approach to find a specific code pattern, whereas the second pattern has difficulty in coping with new malicious scripts since it is difficult to automatically find a decryption function without any known information about a relevant malicious code. However, according to the classification of malicious script encryption techniques of the present invention, the new malicious scripts can be decrypted by a similar method regardless of the kind of encryption pattern, because all of the encryption patterns belong to Type 1 have the same properties.

Now, the decryption of unknown encryption scripts will be discussed. An encrypted malicious code requires program execution to a certain extent during the decryption regardless of whether the decryption is performed through the emulation or actual execution. However, there are problems in the use of the complete emulator or simple profiling method as described above. To avoid these problems, a method of extracting and executing a portion required to decrypt a relevant script is needed. Specifically, if new unknown scripts are concerned, the following two problems arise.

The first problem is directed to the determination on 'whether a concerned script was encrypted'. The presence of encryption and the decryption method of malicious codes that have already been analyzed by anti-virus developers are known. However, in case of new unknown malicious codes, the presence of encryption should be determined only based on an analysis of a concerned script without any known information.

The second problem is directed to the search for 'what is a decryption routine for a concerned script'. Many other functions in addition to a decryption function may be defined in an encrypted script. Therefore, a set of decryption functions should be found independent of a specific code pattern without being influenced by a new unknown encryption technique.

A solution for these problems suggested by the present invention is to derive a natural decryption by replacing all values, which can be constants in a concerned script, with constants without analyzing the object script encryption or the decryption routine. Due to a nature of malicious code of which malicious behavior should not be recognized by a user, most of malicious codes do not take specific user inputs and use only resources commonly available in any systems. Therefore, a set of data given to the malicious code is relatively unchangeable as compared to the general programs. As a result, many variables within a program have the same values in every execution. Specifically, this is remarkable for a portion related to the encryption since the portion should be restored to an original intended code whatever. Therefore, this basic methodology can be applied to the encryption of Type 1, as follows.

Figure 4:
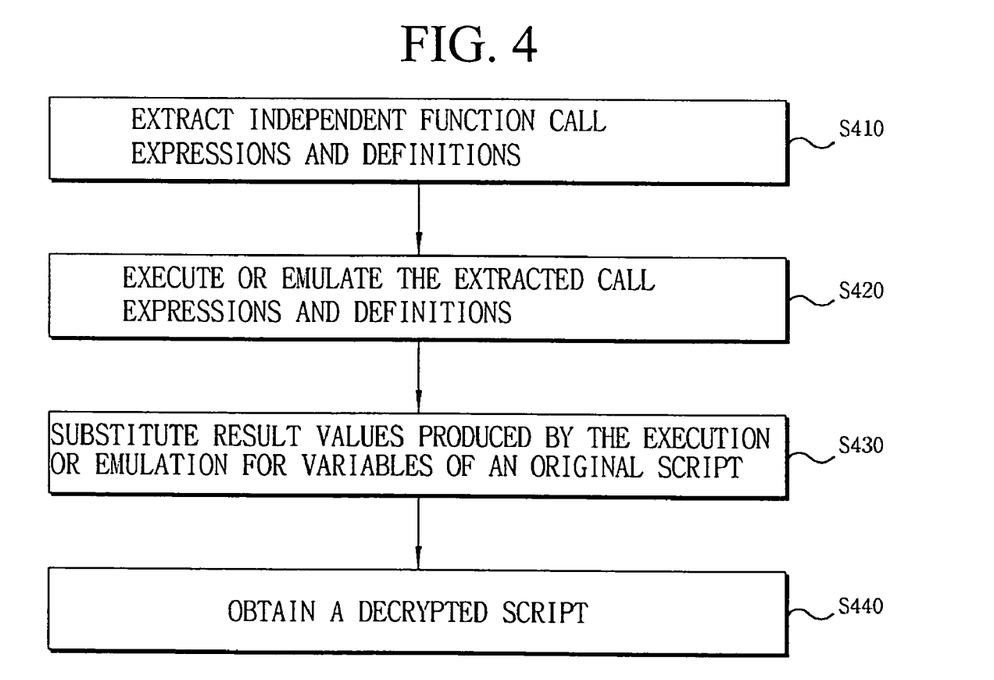
FIG. 4 is a flowchart illustrating a decryption process in a case where a separate decryption function is present and the decryption function is an independent function that is not dependent on external codes according to the present invention.

In case of Type 1, since a decryption function exists as an independent function, encrypted contents can be decrypted through simple substitution for a result value of execution for the independent function. FIG. 4 is a flowchart illustrating a decryption process in a case where a separate decryption function is present and the decryption function is an independent function that is not dependent on external codes according to the present invention. Referring to FIG. 4, call expression and function definition for the independent function are extracted, and they are then executed or emulated (S410 and S420). Subsequently, a decrypted script is acquired by putting a result value obtained from each execution or emulation into an original script at which an original call expression is located (S430 and S440). At this time, even though other functions irrelevant to the decryption may be determined and executed as independent functions, this causes no problems to the script. The reason is that a return value of the independent function is influenced only by parameters given by a definition such that the same values are produced for the same parameters regardless of an execution state.

Now, for easy understanding of the present invention, a specific example of a decryption algorithm for coping with the encryption such as Type 1 will be discussed. As described above, there exist are the actual execution and emulation as a method of obtaining the result value of the call expression of the independent function. In the case of emulation, it is possible to execute only the call expression of function extracted through a data structure within the emulator. Hereinafter, an example in which a result value is obtained through the actual execution will be explained.

Figure 5:
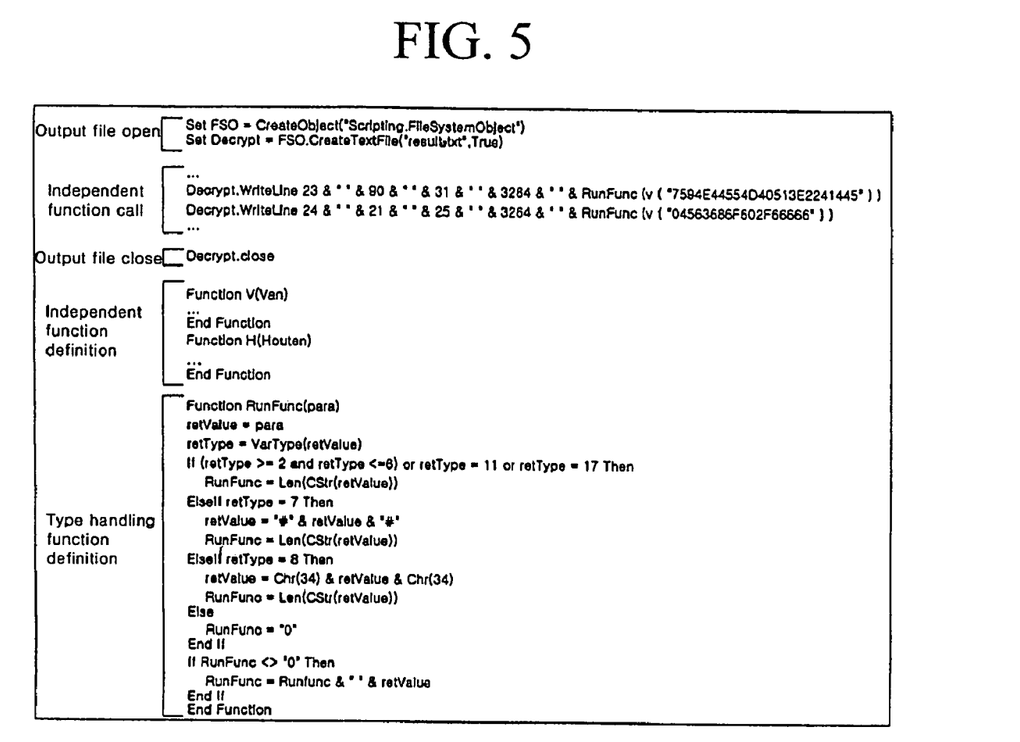
FIG. 5 is an example of a temporary script obtained from the malicious script shown in FIG. 3.

First, when independent functions are completely found, all call expressions for the independent functions are extracted and a temporary script is then generated. Preferably, the temporary script comprises statements that perform the following functions.

a. File open and close for outputting a result value
b. Recording a return value into a file after calling an independent function
c. Defining the independent function
d. Defining a type handling function FIG. 5 is an example of a temporary script obtained from the malicious script shown in FIG. 3. In this figure, it is shown that functions V and H are determined as independent functions and the call results of these functions are recorded in a file. Here, information related to the relevant call expression is recorded along with the result value of the function call expression and corresponds to the numbers described in front of the function call expression in the illustrated example. This information is used in the next step and has the following meanings.

e. Row and column of an original script in which a concerned function call expression was present, and character string length of the concerned function call expression
f. ID of a function containing the relevant call
g. Character string length of an execution result value
h. Execution result value Among this information, the execution result value and the character string length thereof are obtained through the type handling function. The existence of a type handling function is due to a feature of the Visual Basic Script. Only a single type named 'variant' exists in the Visual Basic Script, and a subtype thereof described in Table I below is determined when a specific value is given. Therefore, the functions in the visual basic script may accommodate different types of parameters every time in the same manner as the macro functions and can return result values of different types accordingly.

TABLE 1

| Subtype | Description | Convertible |
|---|---|---|
| vbEmpty | Empty (uninitialized) | x |
| vbNull | Null (no valid data) | x |
| vbInteger | Integer | O |

TABLE 1-continued

| Subtype | Description | Convertible |
|---|---|---|
| vbLong | Long integer | O |
| vbSingle | Single-precision floating-point number | O |
| vbDouble | Double-precision floating-point number | O |
| vbCurrency | Currency | O |
| vbDate | Data | O |
| vbString | String | O |
| vbObject | Automation object | x |
| vbError | Error | x |
| vbBoolean | Boolean | O |
| vbVariant | Variant (used only with arrays of Variants) | x |
| vbDataObject | A data-access object | x |
| vbByte | Byte | O |
| vbArray | Array | x |

Due to such a feature of the Visual Basic Script, the type of return value cannot be confirmed before the visual basic script is executed, and accordingly, an additional process is required for the confirmation of the type of return value when executing the Visual Basic Script. In other words, the temporary script is generated and executed in order to obtain the execution result value in advance and to substitute the obtained result value into the function call expression of the original script. In such a case, it is impossible to transform the temporary script into a character string depending on the subtype, and thus, there exists a typeless value which cannot be written directly into the script. In addition, in order to insert a subtype, which can be expressed by a character string, into the original script, an operation should be performed in such a manner that quotation marks are attached to both ends of the character string, "W"s are attached to both ends of date type, and the other numerical types are transformed into a character string.

To solve these problems, the result of execution of each function call expression is first transformed into an appropriate form of character string through a type handling function shown as 'RunFunc' in FIG. 5. At this time, when a result value of a subtype that cannot be transformed into a character string is generated, a length of the result value is recorded as zero so that it can be recognized during the substitution of function call expression.

Figure 6:
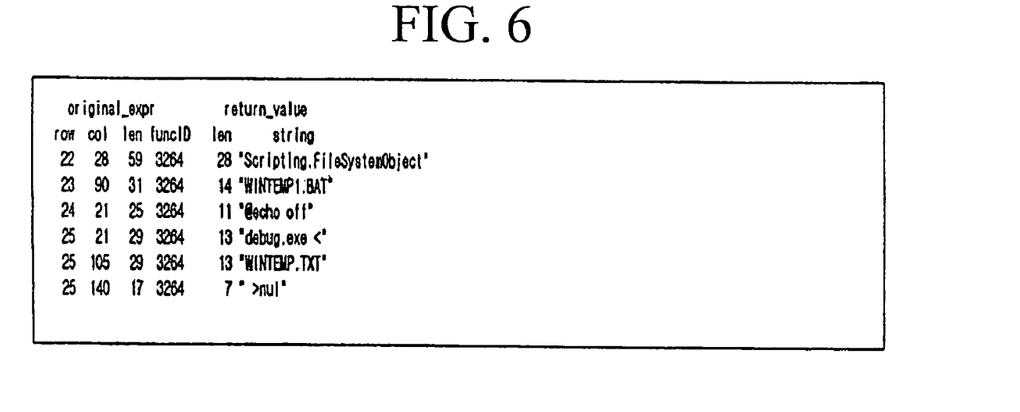
FIG. 6 is an example showing the results of execution for the temporary script shown in FIG. 5.
Figure 7:
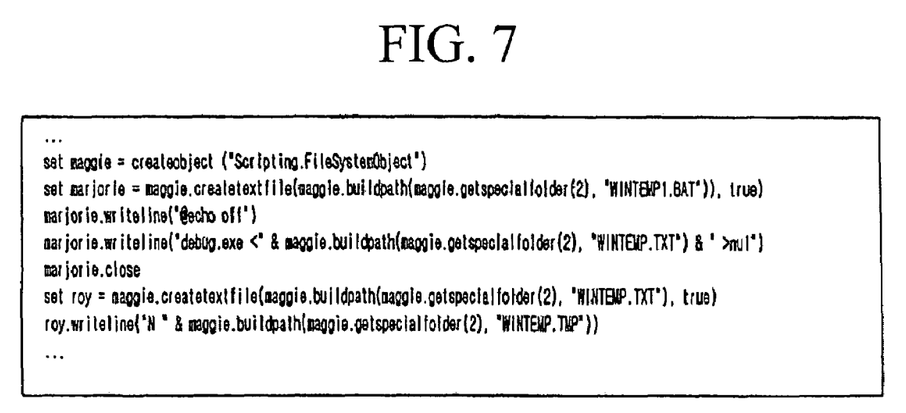
FIG. 7 is an example showing the malicious script that is decrypted through substitution of a value obtained from the execution results shown in FIG. 6.

Subsequently, when the temporary script is generated through the above process, it is executed through the call of Windows Scripting Host so that the execution result values of a relevant function can be obtained. Here, the result of execution obtained from the temporary script generated as shown in FIG. 5 is illustrated in FIG. 6. When the result values of the function call expression are obtained as such, these values are substituted into the original script to obtain a decrypted script. As described above, the result values having a character string length of 0 are excluded from the operation, and a portion for defining an independent function where all the function calls are completely substituted can be deleted because it does not exert any influence on the script execution. The malicious script decrypted after the substitution of result value of the function call is shown in FIG. 7. That is, it can be confirmed that all encrypted character strings were decrypted and all call expressions of the decryption function V and H were substituted by the result values, whereby the definition of the decryption function was deleted.

As described above, the method of analyzing and decrypting the encrypted malicious scripts according to the present invention can decrypt unknown malicious codes promptly and easily through only a single decryption algorithm without any additional data. In addition to the decryption of encrypted codes, complexity of later code analysis can also be reduced by substituting constants for all values that can be set as constants in a relevant script.

Although the present invention has been described in connection with the preferred embodiments thereof, it is apparent to those skilled in the art that various modifications, additions and substitutions can be made thereto without departing from the scope and spirit of the invention as defined in the appended claims.

What is claimed is:

1. A method of analyzing and decrypting a malicious encryption script, comprising the steps of:

classifying a malicious script encryption method into a case where a decryption function exists in malicious scripts and is an independent function that is not dependent on external codes, a case where a decryption function exists and is a dependent function that is dependent on external codes, and a case where a decryption function does not exist;

if the decryption function exists in malicious scripts and is the independent function that is not dependent on the external codes, extracting a call expression and a function definition for the independent function, executing or emulating the extracted call expression and function definition for the independent function, and obtaining a decrypted script by putting a result value based on the execution or emulation into an original script at which an original call expression is located;

wherein dependency of the decryption function on the external codes is established by determining that all codes within the decryption function are defendant on external codes, that actual parameters for decryption function call in all program are constants, and that only functions with no side effects in the decryption function are called; and wherein no dependency of all codes within the decryption function on external codes is established by determining whether all codes within function $F_i$ satisfies the following formula:

$$V_i \cap E_i = \Phi$$

where $V_i$ is a set of global variables defined as used in function $F_{i5}$ and is obtained according to the following formula:

$$V_i = A_i - D_i, \text{ and}$$

$E_i$ is a set of variables defined or used in an external region of function $F_i$ and is obtained according to the following formula:

$$E_i = U^V_j$$

$$I \neq j, 0 \leq j \leq n$$

where n is the number of functions defined in the script, $F_1$ is an i-th defined function in the script ($1 \leq i \leq n$), $A_1$ is a set of all variables defined or used in function $F_1$ ($1 \leq i \leq n$), $D_1$ is a set of all variables declared as Dim in function $F_1$ ($1 \leq i \leq n$), and $V_0$ is a set of variables defined or used in a global region which does not belong to any function.

2. The method according to claim 1 wherein the external codes are run time library.

* * * * *